(12) United States Patent
Chung et al.

(10) Patent No.: US 7,201,483 B2
(45) Date of Patent: Apr. 10, 2007

(54) APPARATUS AND METHOD FOR PROVIDING BOTH DAY AND NIGHT VISION SIMULATIONS

(75) Inventors: Bobby Hsiang-Hua Chung, Atlanta, GA (US); Bart Maximus, Oudenaarde (BE)

(73) Assignees: Fats, Inc., Suwanee, GA (US); Barco Simulation, LLC, Xenia, OH (US)

( * ) Notice: Subject to any disclaimer, the term of this patent is extended or adjusted under 35 U.S.C. 154(b) by 71 days.

(21) Appl. No.: 11/117,646

(22) Filed: Apr. 28, 2005

(65) Prior Publication Data

US 2005/0248734 A1    Nov. 10, 2005

Related U.S. Application Data

(60) Provisional application No. 60/601,489, filed on Aug. 13, 2004, provisional application No. 60/565,924, filed on Apr. 28, 2004.

(51) Int. Cl.
*G03B 21/26* (2006.01)
(52) U.S. Cl. .............................. 353/94; 353/28; 353/84; 353/122; 348/798; 348/122
(58) Field of Classification Search ............ 353/11–13, 353/20, 28, 31, 84, 94, 97, 122; 348/798–801, 348/121, 122, 164
See application file for complete search history.

(56) References Cited

U.S. PATENT DOCUMENTS

| | | | |
|---|---|---|---|
| 6,196,845 B1* | 3/2001 | Streid ........................ 434/44 |
| 6,842,204 B1* | 1/2005 | Johnson ...................... 349/74 |
| 2003/0128427 A1* | 7/2003 | Kalmanash et al. ........ 359/484 |
| 2004/0227899 A1* | 11/2004 | Kurosaka et al. ............ 353/30 |
| 2004/0227906 A1* | 11/2004 | Cole et al. .................. 353/94 |
| 2005/0134811 A1* | 6/2005 | Magarill et al. ............. 353/94 |

\* cited by examiner

*Primary Examiner*—W. B. Perkey
*Assistant Examiner*—Andrew Sever
(74) *Attorney, Agent, or Firm*—Smith, Gambrell & Russell LLP

(57) ABSTRACT

An apparatus for providing both day vision simulations and night vision simulations includes a projector that seamlessly provides both night and daytime training modes. The projector includes two independent light sources, with an embedded night vision filter affixed inside the projector proximate one of the light sources to achieve the night training mode. The operator will select one light source according to the mode desired (daytime training mode or nighttime training mode). Each light source may easily be selected, and the light paths from both of the light sources may have a common path when exiting the projector for efficient operation between modes.

11 Claims, 3 Drawing Sheets

APPARATUS AND METHOD FOR PROVIDING BOTH DAY AND NIGHT VISION SIMULATIONS

CROSS REFERENCE TO RELATED APPLICATIONS

This application claims the benefit of U.S. Provisional Patent Application No. 60/565,924, filed on Apr. 28, 2004, and U.S. Provisional Patent Application No. 60/601,489, filed on Aug. 13, 2004, both of which are herein incorporated by reference in their entirety.

BACKGROUND OF THE INVENTION

1. Field of the Invention

The present invention relates to image projectors, more particularly, to an image projector that operates interchangeably between daytime vision scenarios and night time vision scenarios.

2. Description of the Prior Art

In order to simulate night time training using actual night vision devices such as goggles, monoculars, or scopes in a indoor firearms simulator, the displayed image that is seen by the naked eye must appear to be very dark, having hard-to-see details (just like at night), and the details of the displayed image must appear clear to the user when the user is looking though an actual night vision device.

The night vision device has an image intensifier that detects and amplifies a small amount of visible and infrared light. Traditionally, this has been accomplished by filtering the displayed image from the projector with an external filter (night vision filter) that only allows some visible and all the infrared light though to simulate night vision training. This filter is usually contained in a mechanical assembly that slides across the lens into the light path when night training is required (night vision mode), and then slides out of the light path when day training is required (normal mode).

The type of mounting described above requires an external mounting of the mechanical assembly to the projector. The mechanical assembly needs to be at least two times larger than the lens diameter of the projector in order to operate in the two modes of training and motorized for automatic operation. Consequently, this external mounting suffers from several problems. First, it is a cumbersome assembly that may be difficult to securely handle and provides a "clumsy" appearance of the projector to the user. Furthermore, the night vision mechanical assembly is easily damaged due to external mounting. In addition, this mechanical assembly is expensive to produce due to the various components required for operation, and it is additionally expensive to attach the present device to a particular projector. The introduction of a filter in the imaging part of a projector, between the light valves and the projection screen, will cause a degradation to the image quality, due to the change in optical distance, the possible presence of smudges or scratches, and the possibility to have double reflections in the image.

BRIEF SUMMARY OF THE INVENTION

The present invention is an apparatus for providing both day vision simulations and night vision simulations. The apparatus includes a projector that seamlessly provides both night and daytime training modes, and a method of embedding a night vision filter inside a projector to achieve the night training mode. In particular, the present invention may be used with projectors having dual or multiple redundant projector light sources located within the projector. The operator will select one light source according to the mode desired (daytime training mode or nighttime training mode). Each light source may easily be selected, and the light paths from both of the bulbs have a common path when exiting the projector for efficient operation between modes.

BRIEF DESCRIPTION OF THE DRAWINGS

A projector embodying the features of the present invention is depicted in the accompanying drawings, which form a portion of this disclosure, wherein.

DESCRIPTION OF THE INVENTION

Figure 1:
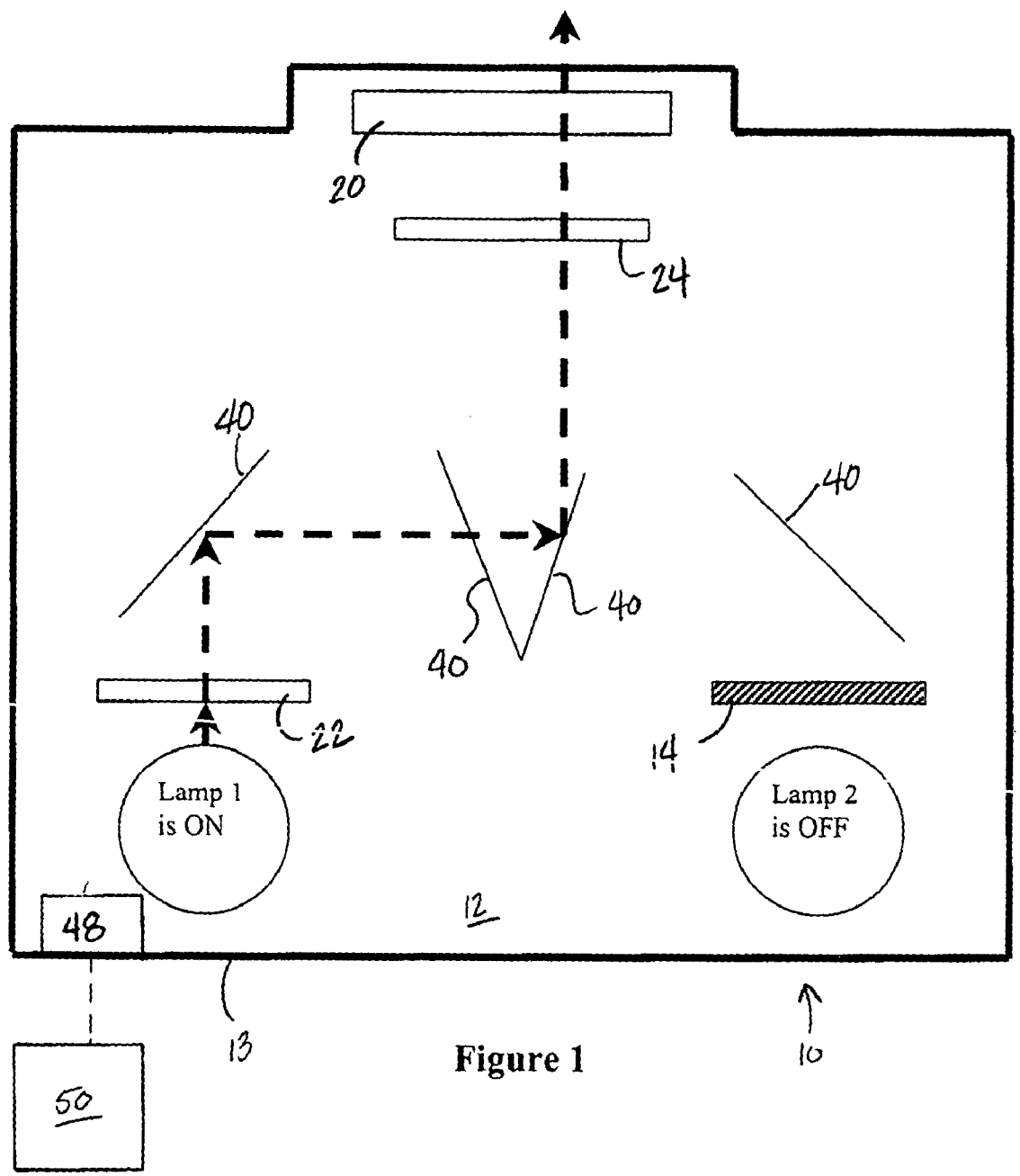
FIG. 1 is a block diagram of the present invention in normal mode.
Figure 2:
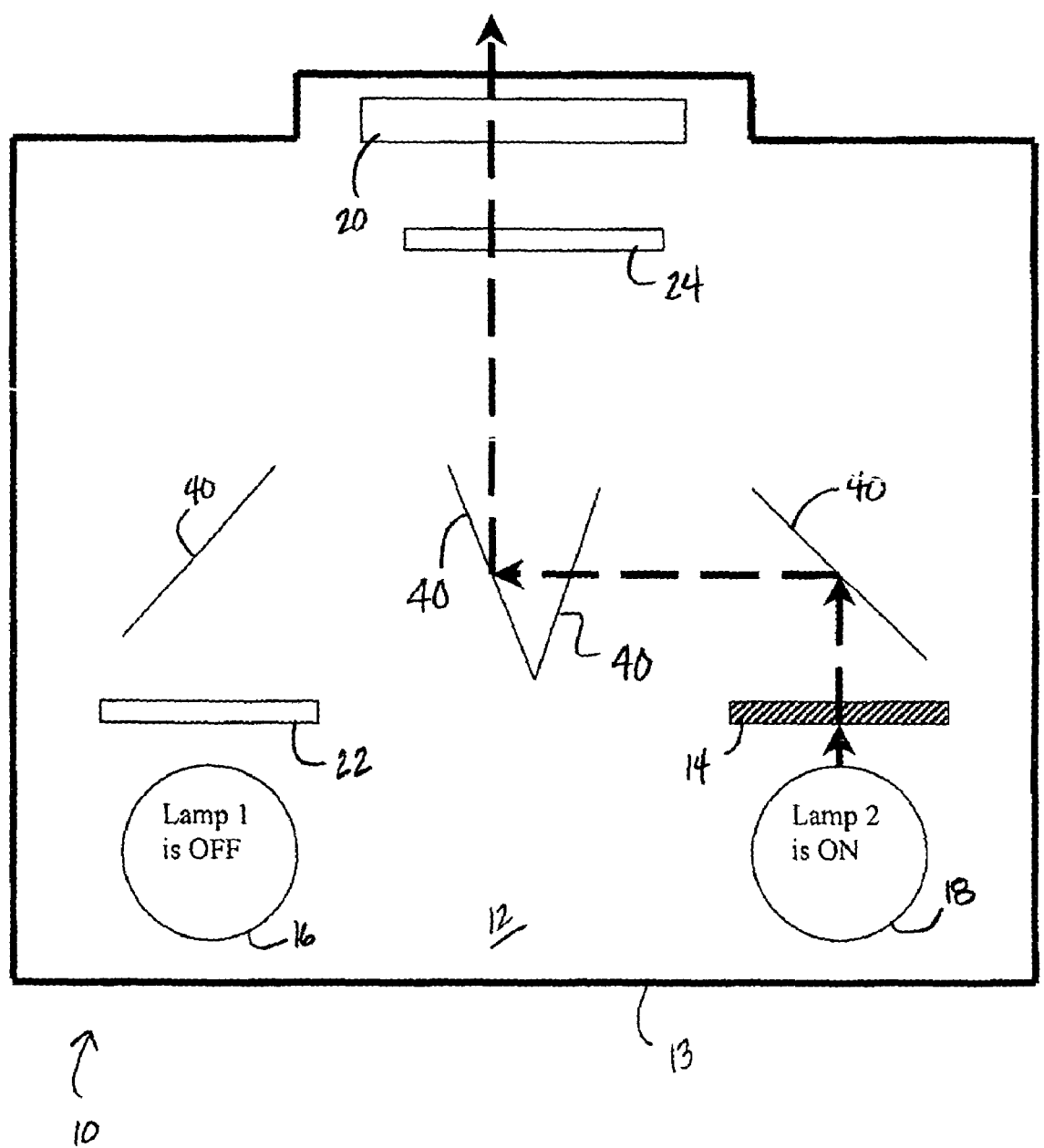
FIG. 2 is a block diagram of the present invention in night vision mode.
Figure 3:
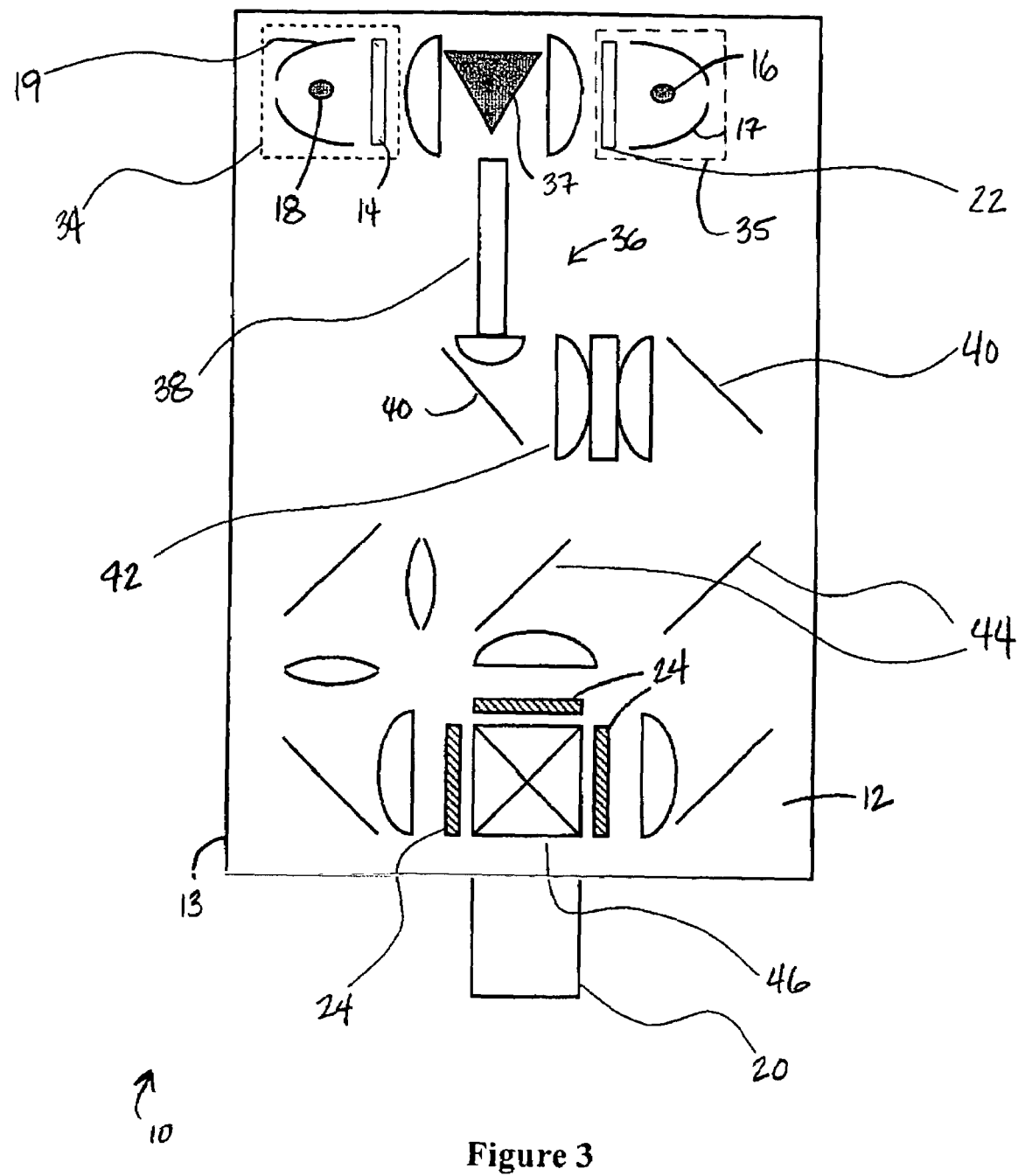
FIG. 3 is a detailed block diagram of the present invention.

Looking to FIGS. 1–3, the present invention of an apparatus 10 for providing both day vision simulations and night vision simulations is illustrated. In particular, the apparatus 10 includes a projector 12 that seamlessly provides both night and daytime training modes, and a method of embedding a night vision filter 14 inside the projector 12 to achieve the night training mode. As shown in FIGS. 1 and 2, the present invention may be used with projectors 12 having dual or redundant projector light sources 16 and 18 located within a housing 13 of the projector 12. The use of dual or redundant light sources 16, 18 is a feature that is included with certain projectors 12 in order to ensure that the projector 12 will always turn on and remain operable for mission critical applications. That is, both light sources 16, 18 are dedicated for the same application, such that if one light source 16, 18 fails, the other light source 16, 18 will be operable to continue the application. Although the light sources 16, 18 have different positions within the projector 12, the light paths from both of the light sources 16, 18 have a common path when exiting the projector 12. Also, the light sources 16, 18 described in the present application are typically light bulbs, but it should be noted that the light sources 16, 18 could also be a laser or some other light generating technology.

In the present invention, a first light source 16 or bulb is turned on for the day time scenarios and then turned off during night time scenarios, as illustrated in FIG. 1. Similarly, a second light source 18 or bulb has the night vision filter 14 in its light path and turns on during the night time scenarios and can then be turned off during day time scenarios, as shown in FIG. 2. In this way, the light is filtered proximate the second bulb 18 before the light reaches the projection lens 20, such that the filter 14 does not have to cover the projection lens 20, and does not have to be positioned outside the projector 12.

Since the light diverges at the second bulb 18, if the filter 14 is close to the bulb 18, the filter 14 can be very small and will fit easily inside the projector 12. Most projectors 12 already have an infrared filter 22 built-in to minimize infrared from damaging the liquid crystal display ("LCD") or digital light processing ("DLP") panels 24. The infrared-cut coating used in such a filter 22 can also be combined with another type of coating like a ultraviolet-cut coating (this is practically done in projectors to lower the costs—only one filter and filter holder instead of two filters and filter holders). Consequently, the replacement of one of the infrared filters 22 with a night vision filter 14 of the same dimension provides the results desired by the user. In addition, the use of two bulbs 16, 18 or light sources in the projector 12 eliminates the need for any external mechanical assembly to move the night vision filter for both day and night training. As is currently envisioned, the present invention is ideally used with projectors 12 that are similar to LCD and DLP technology.

Using a projector 12 with redundant lamp bulb capability, one can embed the night vision training feature in the projector 12 by replacing one of two existing infrared filters 22 with a modified night vision filter 14. This modified night vision filter 14 contains the same properties as the existing infrared filter plus a cut filter that removes much of the visible light. Each of the existing filters 22 is directly in front of each bulb 16, 18. Therefore, the modified night vision filter 14 will be positioned proximate the bulb 18 to be used for night vision training, while the conventional infrared filter will be positioned proximate the opposite bulb for day time training in conventional light.

Looking to FIG. 3, a more detailed illustration of the projector 12 of the present invention is provided. The present invention includes illumination modules 34, 35, which are the combination of the lamp or light source 16, 18, reflector 17, 19, and ultraviolet-infrared filters 22, respectively. The illumination modules 34, 35 are the part of the projector 12 that generate the light and directs it into the direction of an integrating system 36 as described below. The light is nicely filtered so that it has the right spectral composition not to damage optical components that are in the light path.

The projector 12 additionally includes a light rod 38 that acts as an integrating system 36. More specifically, the light rod 38 is a device used to homogenize the light distribution in a light valve projector 12. It may be a long rectangular-shaped or a tapered tube in which the light is sent and where the light will undergo some reflections. The purpose is to mix all the rays of light from the light sources 16, 18 so that at the exit of the light rod 38, the distribution of the light is nicely uniform. To the contrary, at the entrance of the light rod 38 this is certainly not the case, because the light from the lamp 16, 18 and reflector is distributed in a circular shape (more specifically, like a donut because the center is dark since the light traveling in that direction is obstructed by the lamp electrodes and wiring). Light rods 38 can be hollow with mirrors on the side walls (in this case they are more commonly called light pipes) or solid where one counts on the internal reflections inside the glass to keep the light in the light rod 38.

In addition to light rods 38, another type of integrating system 36 are "flye eye lenses" (also identified by 38), which produce a homogenized illumination on the light valves from multiple light sources. In general, the projector 12 will need two sets of segmented lenses at a certain distance from another. The segments of the second fly eye lens element contain lenses that image the segments of the first flye eye element on the light valve or valves. Because all of the images are superimposed on top of each other, the non-uniformities of every single image are averaged out and the total illumination is uniform.

The projector 12 additionally includes at least one light valve 24 or filter. The light valve 24 is the device that is illuminated and then used to modulate the light towards a projection lens 32. The light valve 24 can LCD, DLP or LCOS. An LCD and LCOS device is often referred to as a "panel", while a DLP device is more often called a "chip".

In any case, continuing to look at FIG. 3, light is generated by one of the light sources 16, 18 (more than two light sources may be included as necessary) and filtered through either the conventional ultraviolet-infrared filter 32 or the night vision filter 14. The light is then transmitted through a prism 37, and passes through the integrating system 38 to be reflected by folding mirrors 40 and traveling through a polarization recuperation system 42 for producing a substantially polarized light beam from an unpolarized light beam. The light is further reflected by dichroic mirrors 44 into the light valves 24, as noted above. The light will then be transmitted into an X-cube 46, where the light from each light valve 24 is recombined into a single beam and projected through the projection lens 20 onto the desired background.

The operation of both the night vision bulb 18 and day vision bulbs 16 are preferably controlled by the projector 12. That is, the user can control the night vision training mode and day time training mode using the conventional control circuit 48 in the projector 12. Moreover, the operation of each bulb 16, 18 may be controlled via a controller 50, such as a remote control corresponding to the projector 12 or through some serial communication from the simulation computer connected to the projector 12. In any of the aforementioned cases, the user is able to easily and seamlessly switch between a day vision training mode and a night vision training mode.

As stated above, the modified night vision filter 14 filters infrared similar to the filters of traditional projectors 12 described above. The spectral behavior of the night vision filter 14 is that it should remove at least 90% of the visual light from 480–600 nm. In particular, in one embodiment of the present invention, the night vision filter 14 will remove more than 99% of the visual light from 480–600 nm. Furthermore, night vision filter 14 also has near infrared filter functionality as well, which is still required to protect the optical components from the infrared and near-infrared. As a result, the filter assembly will filter greater than 90% of the visible light (i.e., having a wavelength of 480–600 nm), and close to 100% of the infrared light (i.e., having a wavelength above 720 nm).

In addition, the night vision filter 14 is filtering out most of the visible light, which does not contain any heat. As a result, the assembly addresses that problem of heat dissipation within the projector 12. To address any further heating problems with the projector 12, it can be foreseen that fans (not illustrated) can be added to the housing 13 of the projector 12 to cool the assembly 10 as desired by the user.

The present invention provides a simple solution that is easy to incorporate into dual bulb projectors 12, and is inexpensive since there is no requirement for redesign. Moreover, there are essentially no additional functional parts that are needed to be incorporated into the projector 12 because the ultraviolet-infrared filter is replaced with a combined night vision/ultraviolet-infrared filter. Furthermore, the present design is also very reliable because there are no moving parts added to the projector 12 that can easily malfunction. Another advantage of the present design is that in the night mode, the LCD, LCOS, DLP light modulating device will get a very limited light "burden", which will have a beneficial effect on the lifetime of these components and actually also on some other components in the light path.

Finally, while the present application has been described as having two light sources 16 and 18, it is to be noted that more than two lamps may be used in the projector 12. That is, multiple light sources may be included within the projector as necessary for a particular application. For each additional light source incorporated, corresponding filters will also be used as necessary for the application.

While this invention has been described with reference to preferred embodiments thereof, it is to be understood that variations and modifications can be affected within the spirit and scope of the invention as described herein and as described in the appended claims.

What is claimed is:

1. A projector assembly comprising:
   a projector housing;
   a first light source positioned within said projector housing for simulating day time scenarios, said first light source having a first light path;
   a second light source positioned within said projector housing for simulating night time scenarios, said second light source having a second light path; and
   a night vision filter affixed within said projector housing in said second light path, said night vision filter positioned proximate said second light source to be used for night vision training to provide a maximum of ten percent of the visual light between 480 nm and 600 nm.

2. The projector assembly as described in claim 1, further comprising a controller connected to said first light source and said second light source, said controller enabling shut down of said first light source and second light source according to desired operation of said projector assembly.

3. A projector comprising:
   at least two light sources;
   an integrating system proximate said light sources to combine the light of said multiple light sources and illuminate one or a set of light valves; and
   a night vision filter proximate one of said two light sources to reduce the light from said proximate light source by at least 90% of the visual light from 480–600 nm.

4. The projector of claim 3, further comprising a controller connected to said light sources, said controller enabling shut down of the at least two light sources and sole operation of said light source proximate said night vision filter.

5. The projector of claim 3, wherein said integrating system comprises:
   a light rod;
   a prism of which two sides are used to reflect the light from said light sources into said light rod; and
   at least one light valve;
   wherein the light at the exit of the light rod is sent to said light valve.

6. The projector of claim 3, further comprising three light valves.

7. The projector of claim 3, wherein said integrating system comprises:
   a set of flye eye lenses that will homogenize and send the illumination from said at least two light sources onto a light valve.

8. A projector comprising:
   a housing;
   a day vision illumination module affixed in said housing; and
   a night vision illumination module affixed in said housing, said night vision illumination comprising a night vision filter providing a maximum of ten percent of the visual light between 480 nm and 600 nm;
   said day vision illumination module and said night vision illumination module being independently operated in said housing.

9. The projector as described in claim 8 further comprising a controller selectively determining when said day vision illumination module is operable and when said night vision illumination module is operable.

10. The projector as described in claim 8 wherein said day vision illumination module includes a first light source and a first reflector.

11. The projector as described in claim 8 wherein said night vision illumination module includes a second light source and a second reflector.

* * * * *